US005131011A

United States Patent [19]

Bergmans et al.

[11] Patent Number: 5,131,011

[45] Date of Patent: Jul. 14, 1992

[54] RECEIVER FOR DATA TRANSMISSION SYSTEM WITH NONLINEARITIES

[75] Inventors: Johannes W. M. Bergmans, Eindhoven, Netherlands; Seiichi Mita, Kanagawa; Morishi Izumita, Tokyo, both of Japan

[73] Assignees: N. V. Philips' Gloeilampenfabrieken, Eindhoven, Netherlands; Hitachi, Ltd., Tokyo, Japan

[21] Appl. No.: 545,308

[22] Filed: Jun. 26, 1990

[30] Foreign Application Priority Data

Jun. 26, 1989 [JP] Japan .................................. 1-160756

[51] Int. Cl.[5] .......................... H03D 1/06; H03M 7/00

[52] U.S. Cl. .................................... 375/101; 341/106; 371/37.8; 364/571.07

[58] Field of Search ..................... 375/37, 39, 17, 101; 341/106; 371/37.8, 43; 364/571.07

[56] References Cited

U.S. PATENT DOCUMENTS

| | | | |
|---|---|---|---|
| 4,163,209 | 7/1979 | McRae | 375/101 |
| 4,564,952 | 1/1986 | Karabinis et al. | 375/101 |
| 4,688,226 | 8/1987 | Burgmeier et al. | 341/106 |
| 4,733,402 | 3/1988 | Monsen | 375/101 |
| 4,885,757 | 12/1989 | Provence | 371/43 |
| 4,905,254 | 2/1990 | Bergmans | 375/101 |
| 4,953,183 | 8/1990 | Bergmans et al. | 375/101 |

*Primary Examiner*—Bendict V. Safourek
*Assistant Examiner*—Young Tse
*Attorney, Agent, or Firm*—David R. Treacy

[57] ABSTRACT

Non-linear intersymbol interference and noise in a received data signal are corrected through use of a Viterbi detector which estimates the most likely sequence of transmitted data symbols by keeping track of candidate data sequence that are recursively updated, based on likelihood measures which are determined by a signal processor which includes circuits for estimating hypothesized channel outputs in the absence of noise. Non-linear input-output relations are stored in one or more look-up tables which, in a preferred embodiment, are registers that store hypothesized channel output symbols in the absence of noise. The contents of the look-up tables may be modified in response to an error signal representative of the difference of the channel output signal and the look-up table output signal.

9 Claims, 9 Drawing Sheets

RECEIVER FOR DATA TRANSMISSION SYSTEM WITH NONLINEARITIES

BACKGROUND OF THE INVENTION

1. Field of the Invention

The invention relates to a system for transmitting a data signal at a symbol rate 1/T through a noisy dispersive channel to a data receiver, said channel introducing intersymbol interference and noise into the transmitted data signal; and said receiver estimating the most likely sequence of transmitted data symbols by keeping track of candidate data sequences that are recursively updated on the basis of likelihood measures which are determined with the help of means for estimating hypothesized channel outputs in the absence of noise.

2. Description of the Related Art

Such a system is known from an article by G. D. Forney, Jr., entitled "Maximum-Likelihood Sequence Estimation of Digital Sequences in the Presence of Intersymbol Interference", IEEE Trans. Inform. Theory, Vol. IT-18, No. 3, pp. 363–378, May 1972.

In the forthcoming decades, digital optical storage is expected to find widespread use for storage of computer data as well as of digitized audio and video signals. In systems of this type, binary information is stored as a sequence of pits and lands in an optical medium. Imperfections in the writing process may cause pits and lands to differ in shape or length. In the replay process, this asymmetry manifests itself in the form of nonlinear intersymbol interference (ISI). This disturbance comes on top of linear ISI that arises due, for example, to limitations of optical resolution, and to noise generated in e.g. laser diodes and preamplifiers. Conventional reception techniques are, in general, only able to deal with the latter two imperfections. This even applies for the most powerful variety, whose representatives are commonly referred to as Viterbi detectors. Conventional Viterbi detectors form an estimate of the most likely transmitted data sequence, assuming that only linear ISI and noise are present. To this end, they maintain a list of candidate data sequences that are referred to as survivors. These survivors are recursively extended, and a selection process takes place on the basis of likelihood measures that are calculated for each survivor by comparing the actual channel output signal with a hypothesized output signal that would result if noise were absent and the concerned survivor would have been transmitted. The aforementioned means to form these hypothesized channel output signals conventionally consist of linear weighing networks that operate on a given number of the most recent symbols of concerned survivors.

Basic elements of this detection process are described in more detail, for example, in the aforementioned article by Forney. The conventional Viterbi detector developed in this article has the disadvantage that its complexity grows rapidly to unmanageable proportions as channel memory lengths increase. To overcome this problem, various simplified versions of the conventional Viterbi detector have been developed in recent years, as exemplified, for example, by an article by J. W. M. Bergmans, S. A. Rajput and F. A. M. van de Laar entitled "On the Use of Decision Feedback for Simplifying the Viterbi Detector", Philips J. Res., Vol. 42, No. 4, pp. 399–428, 1987. Partly as a consequence of these efforts towards simplification, conventional Viterbi detectors now find application in such areas as voiceband modems and digital magnetic recording. To date, however, nonlinear ISI has discouraged their use in optical storage.

An article by M. F. Mesiya, P. J. McLane, and L. L. Campbell entitled "Maximum Likelihood Sequence Estimation of Binary Sequences Transmitted over Nonlinear Channels", IEEE Trans. Commun., Vol. COM-25, No. 7, pp. 633–643, July 1977, puts forth a novel type of Viterbi detector that distinguishes itself from conventional Viterbi detectors in that it can handle nonlinear ISI. Unfortunately this ability comes, in general, at the cost of a greatly increased complexity.

SUMMARY OF THE INVENTION

It is the object of the present invention to provide a novel category of Viterbi detectors with the ability to handle a mixture of linear and nonlinear ISI and noise, and with a complexity comparable to that of Viterbi detectors of the abovementioned prior art.

To this end, the receiver according to the invention is characterized in that said means for estimating hypothesized channel output signals in the absence of noise comprise one or more look-up tables.

As look-up tables are ideally suited to store nonlinear input-output relations, they can account for any nonlinearity of the channel. Furthermore, because they all operate on digital data symbols, these look-up tables are often more conveniently implemented in digital technology than the linear weighing networks in receivers of the above-mentioned prior art. In this way the ability to handle nonlinear ISI is generally accompanied by a decreased receiver complexity.

An especially simple version of the receiver according to the invention has only two candidate data sequences, which are recursively updated on the basis of a likelihood measure that is representative for the difference of a function of the likelihoods of both candidate data sequences, and that is determined with the help of means for estimating hypothesized channel outputs in the absence of noise. To facilitate its application at high data rates, this receiver is further characterized in that said likelihood measure is determined by selection among precomputed candidate values of said likelihood measure.

A special version of the receiver according to the invention in which all look-up tables have only one entry is characterized in that said look-up tables take the form of registers that store hypothesized channel output symbols in the absence of noise.

In practice, the precise characteristics of a storage channel usually vary dynamically around a nominal average as a result of e.g. mechanical vibrations and tracking or defocussing errors. As a rule, the performance of Viterbi detectors degrades rapidly when the actual characteristics of the channel come to differ from the ones reflected in said means for estimating hypothesized channel output signals in the absence of noise. The detrimental effects of this channel-receiver mismatch are illustrated, for example, in an article by K. A. Schouhamer Immink entitled "Coding Methods for High-Density Optical Recording", Philips J. Res., Vol. 41, No. 4, pp. 410–430, 1986.

It is a further object of the invention to reduce performance degradation due to said channel-receiver mismatch.

As a first means to this end, the receiver is further characterized in that each look-up table is adapted under the control of digits of said candidate data sequences, in response to an error signal that is representative for the difference of the channel output signal and the output signal of said look-up table.

As a second means to this end, the receiver according to the invention is further characterized in that each look-up table is adapted in response to an error signal that is representative for the difference of a delayed version of the channel output signal and the output signal of said look-up table when addressed by one or more delayed digits of said candidate data sequences.

By making the look-up tables adaptive, they attain the ability to track variations of the channel characteristics. This greatly reduces said channel-receiver mismatch.

For the special case that look-up tables take the form of registers that store hypothesized channel output symbols in the absence of noise, an adaptive version of the receiver according to the invention is further characterized in that each register takes the form of a digital counter that is adapted under the control of one or more delayed digits of said candidate data sequences, in response to an error signal that is representative for the difference of a delayed version of the channel output signal and the contents of said counter.

An especially simple version of a receiver according to the invention is further characterized in that each likelihood measure is representative for an accumulated version of a function that essentially equals the modulus of the difference of the actual channel output signal and a hypothesized channel output signal in the absence of noise. To facilitate its application at high data rates, this receiver is further characterized in that said function is determined by selection among precomputed candidate values of said function.

Preferred embodiments of the invention and their advantages will now be further explained with reference to the drawing.

Figure 12:
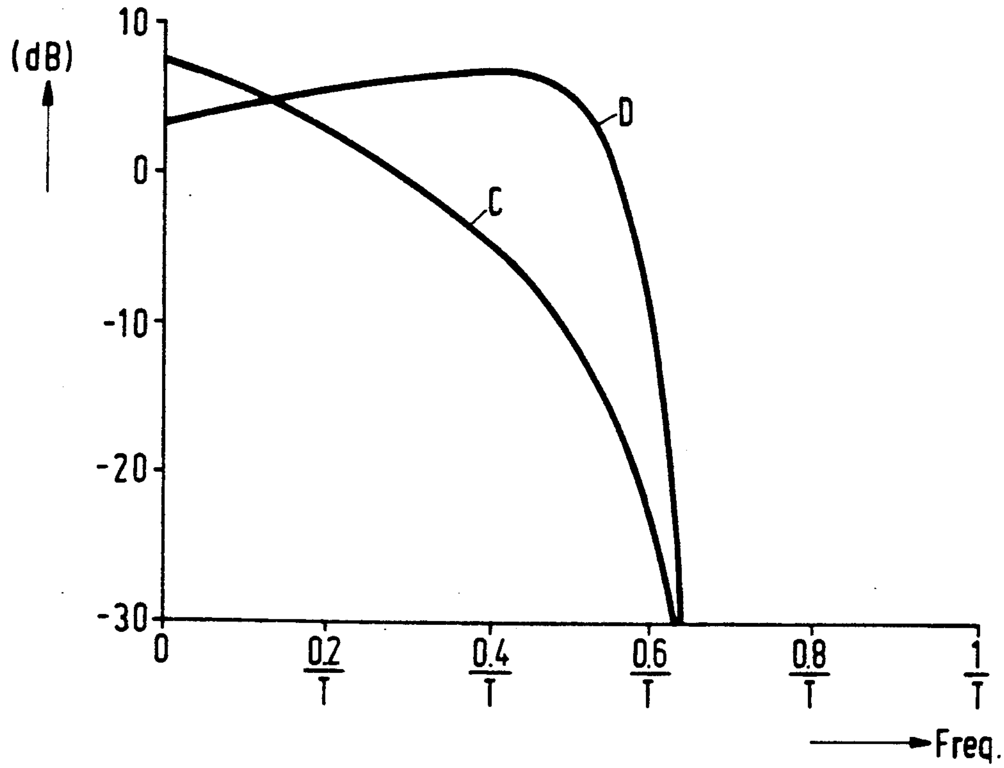
Figure 10:
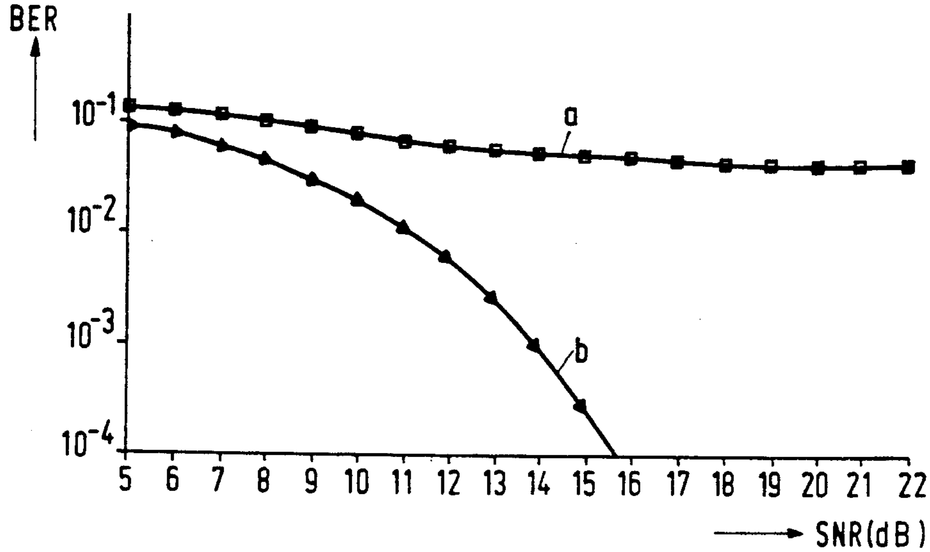
FIG. 10 shows bit error characteristics that were obtained by simulation for a conventional receiver according to FIG. 6 and a receiver according to the invention that conforms to FIGS. 8 and 9.

FIGS. A and B illustrate the nonlinearity mechanism in the system that underlies the simulation results of FIG. 10;

FIG. 12 shows the transfer characteristics of the linear part of the recording channel that underlies the simulation results of FIG. 10.

DETAILED DESCRIPTION OF THE PREFERRED EMBODIMENTS

In all figures, corresponding elements are denoted by the same symbols.

In the following description a discrete-time modelling of the transmission system and the arrangement is used, as the general notion of the invention can be presented in the most simple way with reference to such a modelling. This does not lead to a loss of generality as the present modelling can be derived unambiguously from the parameters of the actual continuous-time system as described, for example, in the book entitled "Digital Communications", by J. G. Proakis, McGraw-Hill, New York, 1983, Chapter 6, and especially Section 6.3, pp. 351-357.

Figure 1:
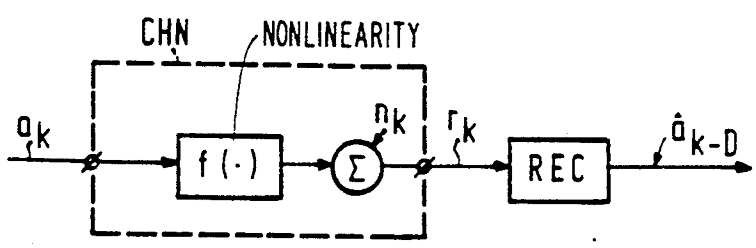
FIG. 1 shows a functional discrete-time model of a system for transmitting data symbols $a_k$ at a symbol rate 1/T through a noisy dispersive channel CHN to a data receiver REC.

FIG. 1 shows a functional discrete-time model of a system for transmitting data symbols $a_k$ at a symbol rate 1/T through a noisy dispersive channel CHN to a data receiver REC. To simplify the exposition, it will henceforth be assumed that the transmitted data signal $a_k$ is binary with $a_k \epsilon \{-1,+1\}$. This assumption is not meant to be restrictive. With self-evident modifications, the invention is equally applicable to multilevel or complex-valued data signals, as encountered in e.g. digital voiceband communication systems. The channel CHN of FIG. 1 models the cascade of the actual continuoustime channel, a possible receiving filter and/or equalizer, and a synchronous sampling operation at the data rate 1/T. The discrete-time output signal $r_k$ of channel CHN can be described as $$r_k = f(a_k) + n_k, \qquad (1)$$

where $n_k$ is a white Gaussian noise signal and f(.) is a deterministic function of a data vector $$a_k = [a_{k-M}, a_{k-M+1}, \ldots, a_k]^T, \qquad (2)$$

where $'^T$ denotes transposition. The nonnegative integer M is referred to as the memory length of the channel. In the absence of nonlinear ISI, $f(a_k)$ assumes the linear form $$f(a_k) = f^T_{\frac{a}{T}\,k}, \qquad (3)$$

where $f=[f_0, \ldots, f_M]$ is a vector of length M+1 whose components specify the impulse response of the channel. The receiver REC in FIG. 1 operates on $r_k$ in order to produce decisions $\hat{a}_{k-D}$ about a delayed version $a_{k-D}$ of $a_k$, where D is a nonnegative integer that is referred to as the detection delay.

Conventional receivers REC are, in general, not able to handle nonlinear ISI. This applies even for the most powerful variety of conventional receivers, whose representatives are generally known as Viterbi detectors. These detectors form an estimate of the most likely transmitted data sequence, assuming that only linear ISI and noise are present. To this end, they maintain at any instant $k-1$ a list with a given number N of candidate data vectors $$s_{k-1}^{i}=[\hat{a}_{k-D}^{i}, \ldots, \hat{a}_{k-1}^{i}]^{T} \text{ for all } i \in \{0, \ldots, N-1\} \quad (4)$$

that are referred to as survivors. In the course of the detection process, this list is recursively updated on the basis of likelihood measures that are calculated for all survivors. Central elements of this process are described, for example, in said papers by Forney and Bergmans et al. To clarify the process in more detail, FIG. 2 depicts a basic model of the likelihood calculations that are associated to any survivor $s_{k-1}^{i}$ in a receiver according to the above-mentioned prior art.

Figure 2:
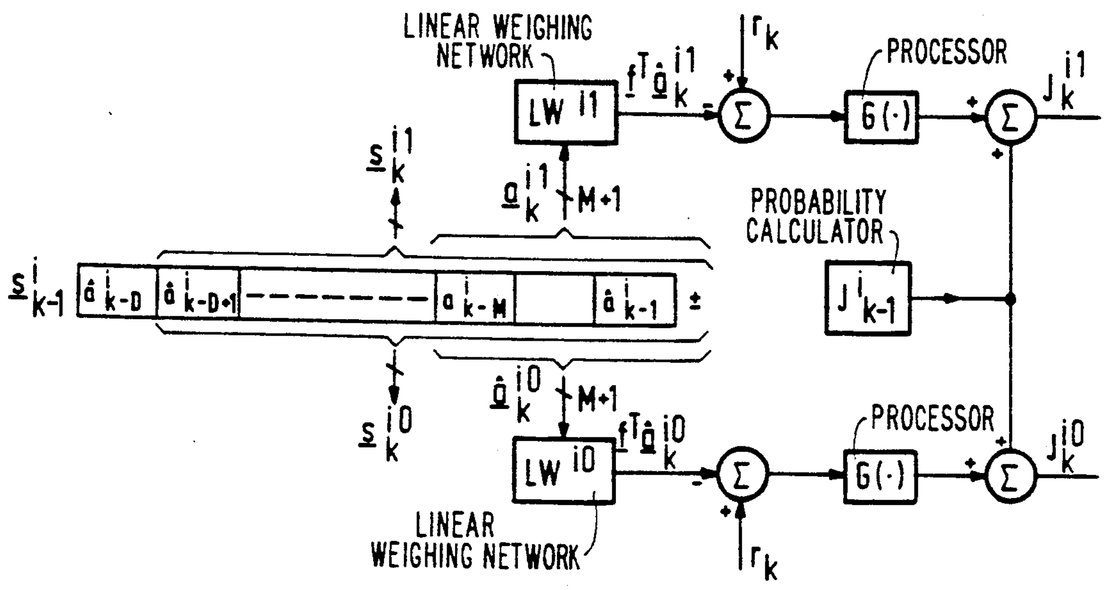
FIG. 2 shows a conceptual model of the computations that are performed for any survivor in a receiver of the above-mentioned prior art to guide the selection process.

In FIG. 2, a measure of accumulated likelihood $J_{k-1}^{i}$ is associated to the survivor $s_{k-1}^{i}$. In accordance with the usual nomenclature, this measure of accumulated likelihood will henceforth be referred to as a metric for the sake of compactness. As a first step in the recursion that is carried out at moment k, the oldest digit $\hat{a}_{k-D}^{i}$ of survivor $s_{k-1}^{i}$ is neglected, and the two possible digits $-1$ and $+1$ are appended in order to obtain two new candidate survivors $$s_{k}^{ij}=[\hat{a}_{k-D+1}^{i}, \ldots \hat{a}_{k-1}^{i}, I(j)] \quad (5)$$

for j=0 and 1, respectively, where the index function I(j) is defined according to $I(0)=-1$ and $I(1)=+1$. For the sake of completeness it is noted that this index function would asume integer values in $0, \ldots, |A|-1$ for a data alphabet that cnsists of $|A|$ rather than 2 distinct symbols. Along this line it is straightforward to apply the invention to multilevel or complex-valued data alphabets. As explained earlier, the forthcoming exposition is entirely cast in terms of a binary alphabet, for which $|A|=2$, solely for the purpose of simplifying the presentation of the invention as much as possible.

Associated to the extended survivors $s_k^{ij}$ are metrics $$J_{k}^{ij}=J_{k-1}^{i}+G[r_{k}-f^{T}a_{k}^{ij}], \quad (6)$$

where $$\hat{a}_{k}^{ij}=[\hat{a}_{k-M}^{i}, \ldots, \hat{a}_{k-1}^{i}, I(j)] \quad (7)$$

is a vector whose components are the $M+1$ most recent components of $s_k^{ij}$, while G(.) is a deterministic function for which the choice $G(\times)=\times^2$ for all $\times \in R$ is common. The components $f^T\hat{a}_k^{ij}$ are generated by linear weighing networks $LW^{ij}$ that operate on the M most recent digits of $s_k^{ij}$, and can be recognized as hypothesized channel output samples that would result on moment k if noise were absent and $s_k^{ij}$ were transmitted. In the usual case that $G(\times)=\times^2$ for all $\times \in R$, the metrics $J_k^{ij}$ can be interpreted as accumulated Euclidean distances between the actual channel output signal $r_k$ and hypothesized channel output signals $f^T\hat{a}_k^{ij}$. As time proceeds,. the detector seeks to minimize this distance across all considered survivors.

To update its list of survivors, the detector compares the metrics $J_k^{ij}$ of the extended survivors for all i E{0, . . . N−1} and j E {0,1}, and makes a selection on this basis. The details of this selection depend on the precise type of Viterbi detector, and will not be described here in further detail as they are immaterial to the invention.

Because of their linear form, the outputs of the linear weighing networks $LW^{ij}$ can only serve as hypothesized channel outputs in the absence of noise for channels CHN that do not introduce nonlinear ISI. For this reason Viterbi detectors that conform to FIG. 2 are intrinsically unable to handle nonlinear ISI.

Figure 3:
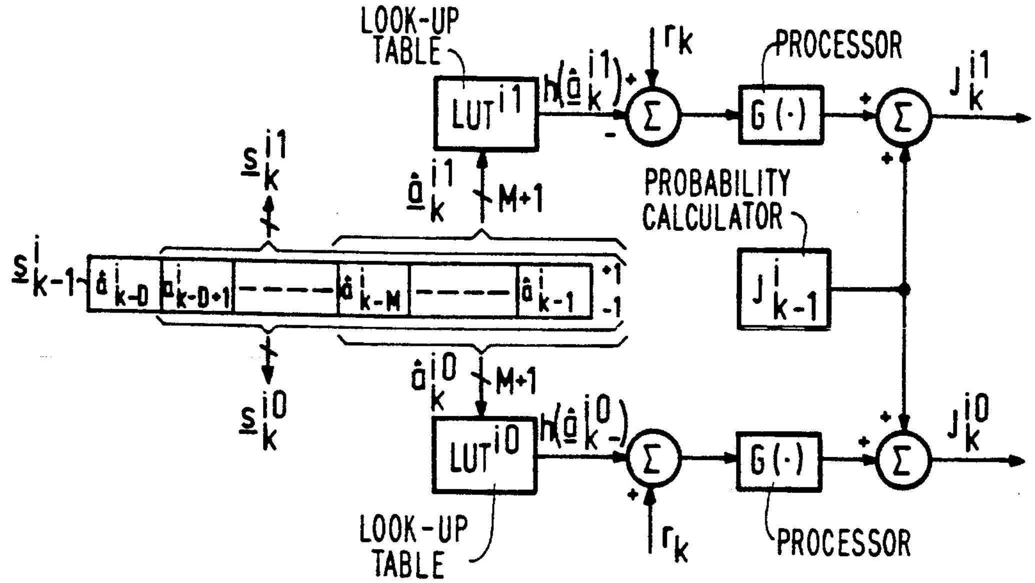
FIG. 3 shows a conceptual model of the computations that are performed for any survivor in a receiver according to the invention to guide the selection process.

Central to the invention is the observation that the linear weighing networks $LW^{ij}$ operate on vectors $\hat{a}_k^{ij}$ with a finite number $M+1$ of binary data symbols. This makes it possible to replace said networks by look-up tables in which the possible hypothesized channel output signals in the absence of noise are all stored. This is shown in FIG. 3. FIG. 3 is identical to FIG. 2 except for look-up tables $LUT^{ij}$ that replace the linear weighing networks $LW^{ij}$. Each table is addressed by a total of $M+1$ binary data symbols and must therefore contain a total of $2^{M+1}$ entries. Even for values of M as large as e.g. 10 this poses no instrumentational problems when use is made of currently available random access memories. In fact, since possible outputs are directly looked up rather than calculated, the configuration of FIG. 3 will generally be easier to implement than that of FIG. 2. Furthermore, since look-up tables can store fully arbitrary input-output relations, the outputs $h(\hat{a}_k^{ij})$ of $LUT^{ij}$ can serve as hypothesized channel outputs in the absence of noise by choosing $$h(a_k)=f(a_k) \text{ for all } a_k. \quad (8)$$

In this way nonlinear ISI can be fully dealt with without increasing the complexity of the receiver. This compares favourably with a novel Viterbi detector that is described in said article by Mesiya et al. This detector also distinguishes itself from Viterbi detectors according to the above-described prior art in that it can handle nonlinear ISI. However, for the Viterbi detector of Mesiya et al. the ability to handle nonlinear ISI comes, in general, at the cost of a greatly increased complexity. For example, in FIG. 3 of said article it is illustrated that for $M=3$ the detector operates on a total of 4 input signals, as opposed to the single input signal $r_k$ for the receiver according to the invention. Furthermore, for each of these 4 input signals various summations need to be performed per symbol interval T and survivor (see eq. (26) of said article by Mesiya et al. and the accompanying explanations), as opposed to the single look-up operation in the receiver according to the invention.

In FIG. 3, the tables $LUT^{i1}$ and $LUT^{i0}$ are addressed by vectors $\hat{a}_k^{i,1}$ and $\hat{a}_k^{i0}$ whose most recent bits $\hat{a}_k^{i1}=+1$ and $\hat{a}_k^{i0}=-1$ are known a priori. This enables both tables to be halved in size, with $LUT^{i1}$ and $LUT^{i0}$ storing only the parts of $f(a_k)$ for which $a_k=+1$ and $-1$, respectively. In various types of Viterbi detector, including those described in said article by Bergmans et al., several of the most recent bits of $\hat{a}_k^{ij}$ are known a priori. This enables further reductions in the size of each table. For certain Viterbi detectors, including the one described in said article by Forney, the complete vectors $\hat{a}_k^{ij}$ are even known a priori. This allows each table to degenerate into a single register that stores the corresponding hypothesized channel output in the absence of noise. An adaptive version of a detector according to the invention that used registers in the form of adaptive digital counters will be described later.

Prior knowledge about the channel characteristics may be used to identify the function f(.). The tables $LUT^{ij}$ can then be filled with appropriate values on the basis of condition (8). Unfortunately, the precise characteristics of a storage channel usually vary dynamically as a result of e.g. mechanical vibrations and tracking or defocussing errors. The function f(.) then fluctuates in time, and it becomes impossible for a time-invariant function h(.) as stored in the look-up tables $LUT^{ij}$ of FIG. 3 to fully match f(.). For the particular case of linear functions f(.) and h(.), the detrimental effects of such a channel-receiver mismatch were studied, for example, in said article by Schouhamer Immink. In this article, it is illustrated that even small mismatches may result in serious performance degradations, especially at high information densities. To avoid such degradations, it is desirable for the function h(.) to track any variations of f(.). This is possible by making the look-up tables $LUT^{ij}$ adaptive, as illustrated in FIG. 4.

Figure 4:
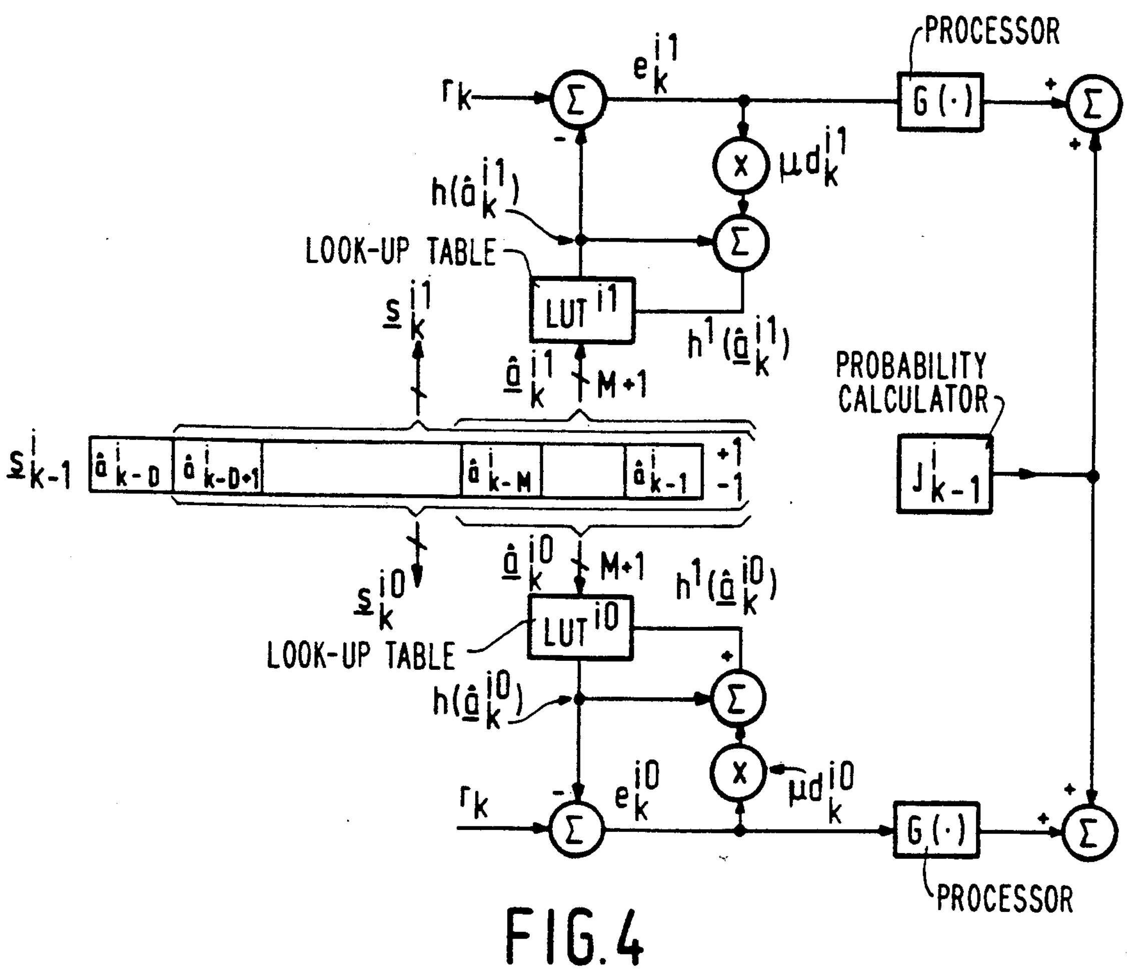
FIG. 4 shows an adaptive version of the conceptual model of FIG. 3.

In FIG. 4, the function h(.) as stored in the look-up tables $LUT^{ij}$ is updated recursively according to $$h'(\hat{a}_k^{ij}) = h(\hat{a}_k^{ij}) + \mu . d_k^{ij} . e_k^{ij} \tag{9}$$

for all i E {0, . . . , N−1} and j ϵ {0,1}. Compared to the old table entries $h(a_k^{ij})$, the new entries $h'(a_k^{ij})$ are ideally improved estimates of $f(a_k^{ij})$. The error signals $$e_k^{ij} = r_k - h(\hat{a}_k^{ij}) \tag{10}$$

indicate how well the hypothesized channel output signals in the absence of noise resemble the actual channel output signal, and the recursion of (9) seeks to minimize this difference iteratively. A more detailed description of the so-called LMS adaptation algorithm that forms the basis for the recursion of (9) can be found, for example, in an article by P. J. van Gerwen, N. A. M. Verhoecks and T. A. C. M. Claasen entitled "Design Considerations for a 144 kbit/s Digital Transmission Unit for the Local Telephone Network", IEEE J. Selected Areas in Commun., Vol. SAC-2, No. 2, pp. 314–323, 1984. This article discusses application of the LMS algorithm to table look-up filters, and is as such closely related to the application presently being discussed. For proper operation of the LMS algorithm, the data vector $a_k$ which by (1) underlies $r_k$ should coincide with the data vector $\hat{a}_k^{ij}$ of the table that is being updated. Among all possible data vectors $\hat{a}_k^{ij}$, the one with greatest accumulated likelihood is most likely to satisfy this prerequisite. For this reason, the selector signals $d_k^{ij}$ of expression (9) are chosen according to $$d_k^{ij} = \begin{cases} 1 \text{ if } J_k^{ij} < J_k^{nl} \text{ for all } n\epsilon\{0, \ldots, N-1\} \text{ and } 1\epsilon\{0, 1\}, \\ 0, \text{ Else.} \end{cases} \tag{11}$$

Thus at any instant k at most one of the tables is updated. It can be observed that the selector signals $d_k^{ij}$ of (11) are entirely based on information that is generated as an integral part of the detection process. For this reason they can be generated with a minimum of extra hardware. The adaptation constant μ in (9) enables a tradeoff between speed of convergence of the tables and steady state excess mean-square error. To simplify a digital implementation of the algorithm, μ is usually chosen to be of the form $2^{-W}$ for some positive integer W, so that the multiplication by μ in (9) amounts to a shift over W bit positions. For the sake of compactness, these and other aspects of the LMS algorithm and its implementation are not described here in further detail, as they are well documented in the literature, see e.g. said article by van Gerwen et al. A detailed description of an adaptive receiver according to the invention and based on a simplified version of the LMS algorithm will be given later.

In practice it is advisable to initialize the table entries $h(\hat{a}_k^{ij})$ in accordance with the average characteristics of the channel, provided that these are known a priori. In this way the adaptation algorithm only has to bridge the distance between the average and the actual characteristics, thereby allowing comparatively rapid convergence. For the situation that tables are initialized randomly, simulations reveal that convergence periods can often be reduced significantly by adding an appropriate amount of noise to the receiver input signal during the initial phase of adaptation.

A disadvantage of the configuration of FIG. 4 is that very recent estimated data symbols play a role in the adaptation process. By nature of Viterbi detection, these symbols are less reliable estimates of the transmitted data signal than the older digits that also form part of the maintained survivors. More specifically, even if a given survivor $s_k^{ij}$ has greatest current likelihood, its most recent digits (e.g. $\hat{a}_k^{ij}$ and $\hat{a}_{k-1}^{ij}$) may not coincide with the corresponding transmitted digits. Especially for functions f(.) with a weak dependence on these most recent transmitted digits this may in fact occur quite frequently. By (9) and (10) this would equally often cause erroneous table entries to be updated, a problem that may hamper or even preclude convergence of the table contents to the proper values.

Figure 5:
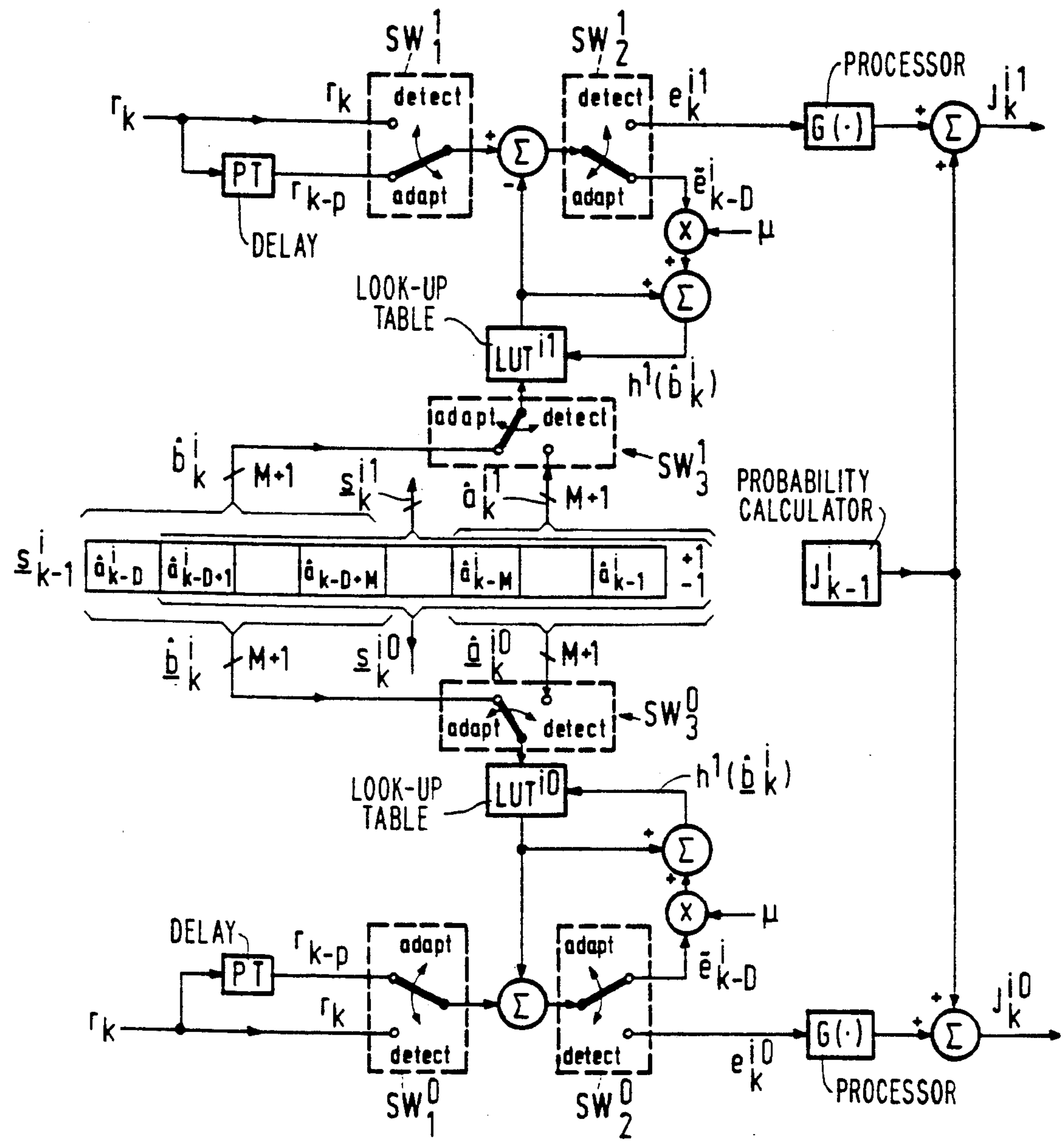
FIG. 5 shows an adaptive version of the conceptual model of FIG. 3 in which adaptation is based on delayed digits of the survivor.

To overcome this problem it is necessary to base adaptation on more reliable and hence delayed estimates of the transmitted data signal. A natural possibility to this end is outlined in FIG. 5. When the six switches $SW_0^0$, . . . $SW_2^1$ of FIG. 5 are in the position "detect", detection proceeds exactly as in FIG. 4, with the look-up tables $LUT^{ij}$ addressed by the estimated data vectors $\hat{a}_k^{ij}$. For adaptation the switches are placed in the position "adapt". In this case a delayed data vector $$\hat{b}_k^i = [\hat{a}_{k-M-P}^i, \ldots, \hat{a}_{k-P}^i] \tag{12}$$

addresses every look-up table $LUT^{ij}$. If the delay P is taken sufficiently large, then the digits $A_{k-M-P}^i$, . . . , $\hat{a}_{k-P}^i$ are for any i likely to be reliable estimates of the actually transmitted data symbols $a_{k-M-P}$, . . . , $a_{k-P}$. Greatest reliability is obtained by selecting the maximum value P=D−M, as shown in FIG. 5, so that the digits $\hat{a}_{k-M-P}^i$, . . . , $a_{k-P}^i$ of $b_k^i$ are the M+1 oldest maintained digits $\hat{a}_{k-D}^i$, . . . , $\hat{a}_{k-D+M}^i$ of survivor $s_{k-1}^i$. To compensate for the data delay of P symbol intervals, the received signal $r_k$ is also delayed over P symbol intervals in order to form a delayed error signal $$\hat{e}_{k-P}^i = r_{k-P} - h(\hat{b}_k^i), \tag{13}$$

which is used to update the look-up table $LUT^{ij}$ according to the LMS logarithm $$h'(\hat{b}_k^i) = h(\hat{b}_k^i) + \mu . \hat{e}_{k-P}^i . \tag{14}$$

As the data estimates used in this adaptation process are all relatively reliable, it is unnecessary in (14) to use selector signals to condition adaptation on current or past likelihood measures.

A disadvantage of the configuration of FIG. 5 is that each table is read out twice per symbol interval for calculation of error signals that play a role in detection and adaptation, respectively. Relative to FIG. 4, where these two functions are combined, this lowers the largest attainable data throughput. To overcome this problem it is possible to base adaptation on delayed versions of the error signals that were calculated for detection P symbol intervals earlier. This also makes it unnecessary to delay the received signal $r_k$. A simplified version of this possibility will be described later.

To exemplify the preceding notions, two versions of a two-state Viterbi detector with nonlinear feedback according to the invention will now be developed. To facilitate the explanation, a related Viterbi detector of prior art will be described first.

Figure 6:
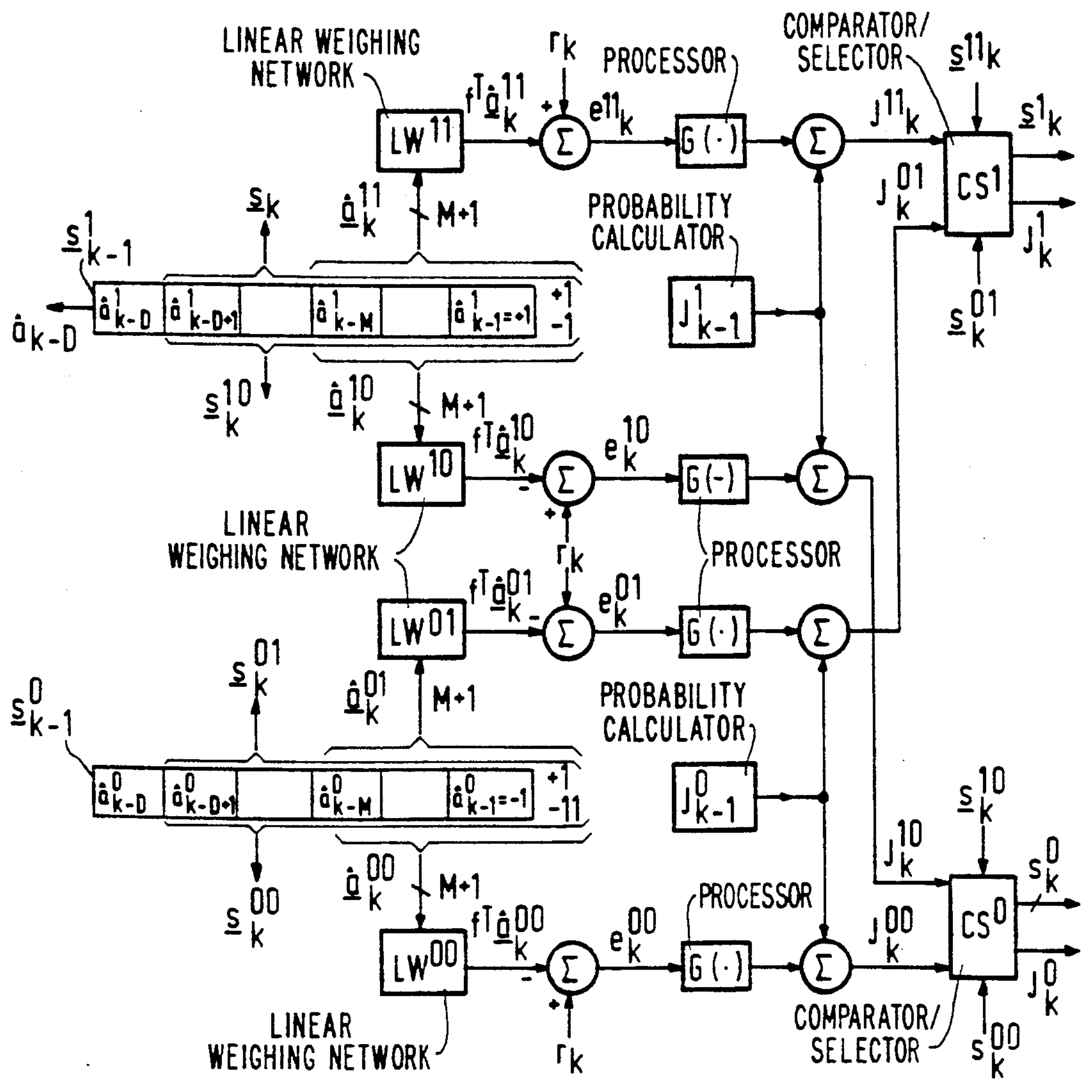
FIG. 6 shows a model of a 2-state Viterbi detector with linear feedback according to the above-mentioned prior art.

FIG. 6 shows a conceptual model of a two-state Viterbi detector with linear feedback as described in the aforementioned article by Bergmans et al. This detector has two survivors $s_{k-1}^0$ and $s_{k-1}^1$ conforming to eq. (4), with associated metrics $J_k^i$ for i=0,1. The four extended survivors $s_k^{ij}$ for $i,j \in \{0,1\}$ are defined as in (5) and have metrics $J_k^{ij}$ according to (6). Four linear weighing networks $LW^{ij}$ with $i,j \in \{0,1\}$ calculate the four possible weighted sums $f^T\hat{a}_k^{ij}$ of eq. (6). As explained earlier, the vector f specifies the impulse response of the channel. This may be achieved, for example, with the help of adaptive techniques, as described in the aforementioned book by Proakis, chapter 6, pp. 410-412. Details of these techniques as applied in receivers of prior art are immaterial to the invention and therefore not discussed or shown here.

Among the extended survivors $s_k^{0j}$ and $s_k^{1j}$, a Compare.Select unit $CS^j$ selects the new survivor $s_k^j$ with associated metric $J_k^j$ for moment k according to the rule $$\begin{aligned}&\text{If } J_k^{0j} < J_k^{1j} \text{ Then Begin } s_k^j := s_k^{0j};\ J_k^j := J_k^{0j}\\ &\text{End}\\ &\text{Else Begin } s_k^j := s_k^{1j};\ J_k^j := J_k^{1j}\\ &\text{End}\end{aligned} \tag{15}$$

This rule is applied for both j=0 and j=1. It can be noted from (15) that the most recent digits $\hat{a}_k^j$ of the new survivors $s_k^j$ are always equal to the index function I(j), i.e. $\hat{a}_k^0=-1$ and $\hat{a}_k^1=+1$ for all k. Because of the recursive nature of the detection process, this means that the most recent digits $a_{k-1}^i$ of the old survivors $s_{k-1}^i$ must also equal $\hat{a}_{k-1}^0=-1$ and $\hat{a}_{k-1}^1$ irrespective of k. Thus, for the extended survivors $s_k^{ij}$, the two most recent digits $\hat{a}_{k-1}^{ij}$ and $\hat{a}_k^{ij}$ are both known a priori to equal I(i) and I(j), respectively.

For any Viterbi detector, it is desirable to have a detection delay D much greater than the channel memory length M, as explained, for example, in the aforementioned article by Forney. In this case, the oldest digits $\hat{a}_{k-D}$ and $\hat{a}_{k-D}^0$ are both comparatively reliable estimates of the transmitted digit $a_{k-D}$. In FIG. 4, $\hat{a}_{k-D}^1$ is arbitrarily chosen to be the detector output $\hat{a}_{k-D}$. This choice is only illustrative and is not meant to be restrictive, for it is clear that a different choice, such as $\hat{a}_{k-D}=\hat{a}_{k-D}^0$, might be equally appropriate.

Further discussion of the detection process of FIG. 6 is not made here in view of the detailed description in said article by Bergmans et al.

A disadvantage of the detector of FIG. 6 is that the metric values $J_k^i$ are, by (6) and (15), a non-decreasing function of time in the usual case that the function G(.) is nonnegative definite. This may cause problems of overflow in a digital implementation of the detector. From (15) it can be noted that only differences between metrics play a role in the selection of new survivors. This observation may be used to re-normalize metric values in such a way that they are no longer a non-decreasing function of time. To this end, the modified metrics $Q_k$, $Q_k^0$ and $Q_k^1$ are defined as $$Q_k=J_k^1-J_k^0, \tag{16}$$

and $$Q_k^i=J_k^i-J_{k-1}^0 \tag{17}$$

for $i \in \{0,1\}$ and all k. By making use of (6), it is straightforward to reformulate (15) in terms of these modified metrics as $$\begin{aligned}&\text{If } Q_k + G[e_k^{1j}] < G[e_k^{0j}] \text{ Then Begin}\\ &\quad s_k^j := s_k^{1j};\ Q_k^i := Q_{k-1} + G[e_k^{1j}]\\ &\text{End}\\ &\text{Else Begin}\\ &\quad s_k^j := s_k^{0j};\ Q_k^i := G[e_k^{0j}]\\ &\text{End}\end{aligned} \tag{18}$$

where the error signals $e_k^{ij}$ are defined as $$e_k^{ij}=r_k-f^T\hat{a}_k^{ij} \tag{19}$$

for i, j E {0,1}. Furthermore, from (16) and (17) it is seen that $Q_k$ can be directly calculated from $Q_k^0$ and $Q_k^1$ according to $$Q_k=Q_k^1-Q_k^0. \tag{20}$$

Figure 7:
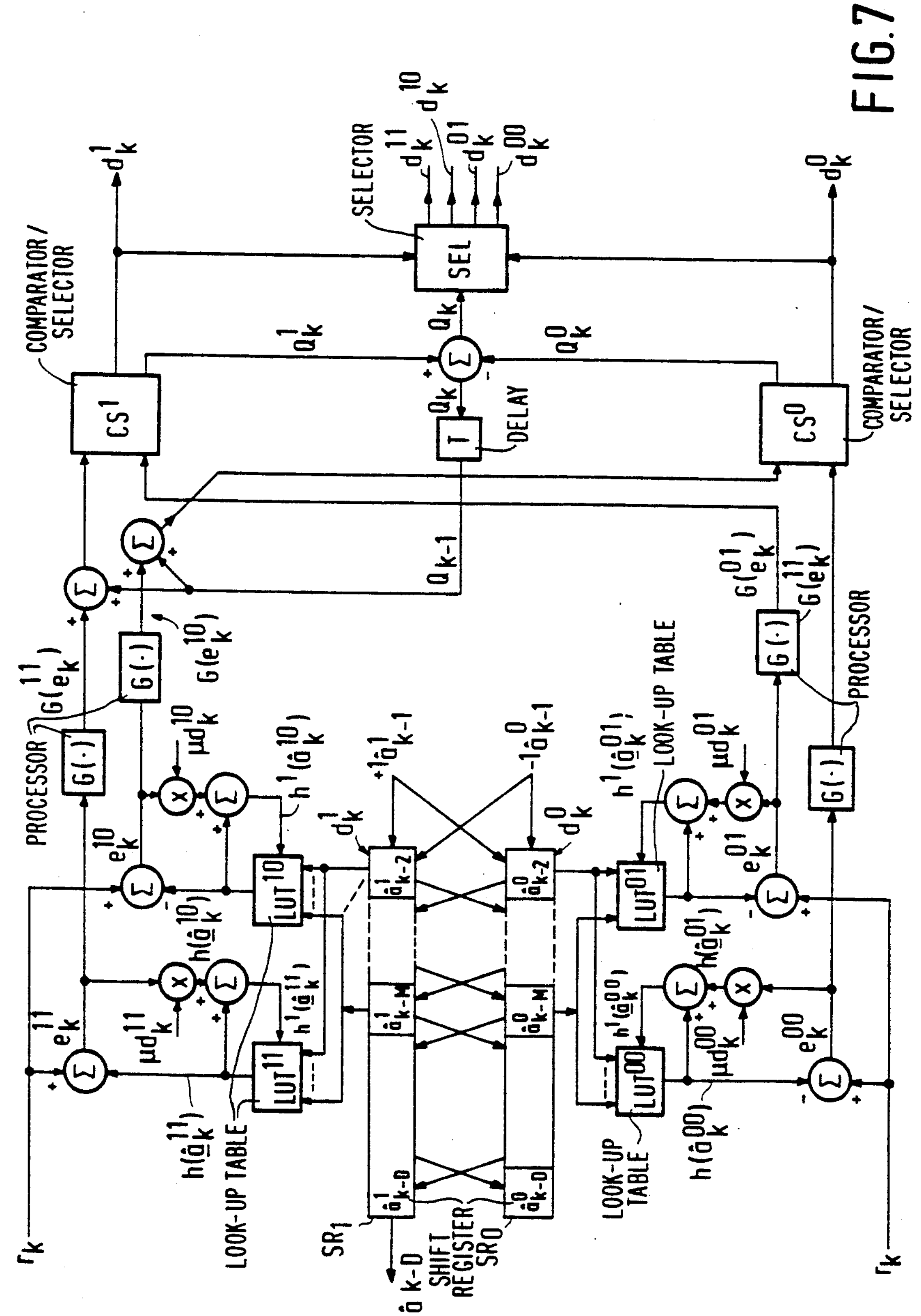
FIG. 7 shows a conceptual model of an adaptive 2-state Viterbi detector with nonlinear feedback according to the invention.

Thus the complete selection process can be recast in terms of only three difference metrics $Q_k$, $Q_k^0$ and $Q_k^1$. As these metrics all fluctuate around zero in value, problems of overflow in a digital receiver implementation can be avoided by a proper choice of digital word-lengths. An adaptive receiver according to the invention that incorporates these difference metrics is shown in FIG. 7. For the sake of completeness it is mentioned here that the use of these difference metrics is in itself not new, witness e.g. an article by R. W. Wood and D. A. Peterson entitled "Viterbi Detection of Class IV Partial Response on a Magnetic Recording Channel", IEEE Trans. Commun., Vol. COM-34, No. 5, pp. 454-461, May 1986, and in particular the passage that surrounds expressions (11) and (12) of this article.

In the receiver of FIG. 7, two compare-select units $CS^0$ and $CS^1$ are used to control the selection process of eq. (18) for j=0 and j=1, respectively. Based on input signals $Q_k+G[e_k^{1j}]$ and $G[e_k^{0j}]$, compare-select unit $CS^j$ produces an output signal $Q_k^j$ according to eq. (18), and a selector signal $d_k^j$ according to $$\text{If } Q_{k-1}+G[e_k^{1j}]<G[e_k^{0j}] \text{ Then } d_k^j:=1 \text{ Else } d_k^j:=0; \tag{21}$$

By comparing (18) and (21), it is seen that this selector signal $d_k^j$ can be used to control the selection of survivors according to the rule $$\text{If } d_k^j = 1 \text{ Then } s_k^j := s_k^{1j} \text{ Else } s_k^j := s_k^{0j}; \quad (22)$$

which applies for both $j=0$ and $j=1$.

To implement this selection process, two shift registers $SR^0$ and $SR^1$ store the digits $[\hat{a}_{k-D}^0, \ldots \hat{a}_{k-2}^0]$ and $[\hat{a}_{k-D}^1, \ldots, \hat{a}_{k-2}^1]$ of the survivors $s_{k-1}^0$ and $s_{k-1}^1$, respectively. As explained earlier, the most recent digits of these survivors are a priori known to be $\hat{a}_{k-1}^0 = -1$ and $\hat{a}_{k-1}^1 = 1$, and these digits are therefore represented in the form of fixed logical levels $+1$ and $-1$ that are connected to the inputs of both shift registers.

For shift register $SR^0$, a selector signal $d_k^0=0$ indicates by (22) that the new survivor $s_k^0$ should be $s_{k-1}^{00}$. By (7), $s_k^{00}$ is just a shifted version of $s_{k-1}^0$, with the oldest digit $\hat{a}_{k-D}^0$ removed and a most recent digit $\hat{a}_k^0 = -1$ appended. Thus the selection $s_k^0 := s_k^{00}$ can be realized with a SHIFT LEFT operation on shift register $SR^0$. Similarly, a selector signal $d_k^0=1$ indicates that the new survivor $s_k^0$ should be $s_k^{10}$. By (7), $s_k^{10}$ is just a shifted version of $s_{k-1}^1$, with the oldest digit $\hat{a}_{k-D}^1$ removed and a most recent digit $\hat{a}_k^0 = -1$ appended. Thus the selection $s_k^0 := s_k^{10}$ can be realized with a PARALLEL LOAD operation in which shift register $SR^0$ is loaded with a shifted version of the contents of shift register $SR^1$ and the most recent digit $\hat{a}_{k-1}^1 = +1$. This symbolically indicated in FIG. 7 by means of the skew arrows that run from $SR^1$ and e,cir/a/ $_{k-1}{}^1 = 1$ to $SR^0$. For shift register $SR^1$, the selector signal $d_k^1$ similarly indicates either a SHIFT LEFT operation for $d_k^1=1$, or a LOAD PARALLEL operation from shift register $SR^0$ and digit $\hat{a}_{k-1}^0 = -1$ for $a_k^1 = -1$.

For the sake of completeness it is necessary to mention a potential problem that may occur in a direct implementation of the shift register configuration of FIG. 7 as a consequence of poor matching of the propagation delays of both shift registers. If shift register $SR^1$ happens to have a significantly smaller propagation delay than shift register $SR^0$, then a PARALLEL LOAD operation on $SR^0$ may cause one or more digits of the new survivor $s_k^1$ rather than the desired ones of the old survivor $SR_{k-1}^0$ to be loaded into $SR^1$. Similarly, if the propagation delay of shift register $SR^0$ is significantly smaller than that of $SR^1$, then a LOAD PARALLEL operation on shift register $SR^1$ may cause one or more digits of the new survivor $s_k^0$ rather than the desired ones of the old survivor $s_{k-1}^0$ to be loaded into $SR^1$. Both possibilities are clearly undesirable. To avoid this problem, it is possible in a practical implementation of the receiver of FIG. 7 to choose shift registers $SR^1$ and $SR^0$ with well-matched propagation delays, or to latch the cross-couplings between both shift registers. As the diagram of FIG. 7 is merely meant to provide a conceptual model of a receiver according to the invention, possibilities to avoid this implementation-level problem will not be elucidated here in any further detail.

In FIG. 7, the look-up tables $LUT^{ij}$ with i,j, $\epsilon$ {0,1} are addressed by the digits $[\hat{a}_{k-M}^i, \ldots, \hat{a}_{k-2}^i]$ of survivor $s_{k-1}^i$. By (5) and (7), these digits coincide with the corresponding digits of the address vectors $a_k^{ij}$. The remaining two digits are known a priori to be $\hat{a}_{k-1}^{ij} = I(i)$, as explained for the receiver of FIG. 6. As argued earlier, it is unnecessary to add such a priori known digits to the address vector of look-up tables. This allows each table to be 4 times smaller in size than for an address vector of the "full" length $M+1$. Mathematically speaking, this four-fold reduction is possible because the four look-up tables $LUT^{ij}$ cover disjunct portions of the domain of $h(a_k)$, viz. those portions for which $a_{k-1}=I(i)$ and $a_k=I(j)$.

The adaption mechanism for the look-up tables $LUT^{ij}$ is identical to that of FIG. 4 and is therefore not explained in further detail. At any instant k, the selector signals $d_k^{ij}$ are such that only the table that corresponds to the most likely extended survivor is updated. These selector signals are produced by a selector unit SEL that operates, for example, on the signals $Q_k$, $d_k^0$ and $d_k^1$ according to the following truth table:

| $Q_k$ | $d_k^0$ | $d_k^1$ | $d_k^{00}$ | $d_k^{01}$ | $d_k^{10}$ | $d_k^{11}$ |
|---|---|---|---|---|---|---|
| $<0$ | 0,1 | 1 | 0 | 0 | 0 | 1 |
| $<1$ | 0,1 | 0 | 0 | 0 | 1 | 0 |
| $>0$ | 1 | 0,1 | 0 | 1 | 0 | 0 |
| $>0$ | 0 | 0,1 | 1 | 0 | 0 | 0 |

To explain this table, it can be noted from (16) and the accompanying explanation that any positive value of $Q_k$ indicates that the new survivor $s_k^0$ is more likely than its counterpart $s_k^1$, and vice versa for a negative value of $Q_k$. Thus, for positive $Q_k$ it is necessary to distinguish between the two extended survivors $s_k^{00}$ and $s_k^{01}$ that underly $s_k^0$. The signal $d_k^0$ can be used to this end, as it specifies, by eq. (22), exactly which of these two extended survivors forms $s_k^0$. Similarly, for $Q_k<0$ the signal $d_k^1$ specifies which of the two selector signals $d_k^{01}$ and $d_k^{11}$ is to be 1, while the other two selector signals are zero.

An attractive choice for the function G(.) in FIG. 7 is $G(\times)=|\times|$ for all $\times \epsilon$ R, since this function can be easily realized or approximated with digital circuitry. Simulations for the receiver of FIG. 7 reveal that in many cases this choice yields performances that are essentially equivalent to those for the usual function $G(\times)=\times^2$ for all $\times \epsilon$ R, which is comparatively difficult to realize or approximate with digital circuitry.

With respect to the receiver of FIG. 7, it remains to mention that the new value $Q_k$ is determined from the signals $Q_k^1$ and $Q_k^0$ according to eq. (20) by means of a summator, while a delay unit stores $Q_k$ for use during the next symbol interval. Furthermore, the oldest digit $\hat{a}_{k-D}^1$ serves as the output $\hat{a}_{k-D}$ of the receiver, as in FIG. 6. For the sake of brevity, further aspects of the receiver are not elaborated here as they are either sufficiently self-evident or sufficiently similar to aspects that were discussed before.

The receiver of FIG. 7 is attractive in that it combines a complexity no greater than that of its linear counterpart of FIG. 6 with the ability to handle any form of linear or nonlinear ISI. Together with the receiver of FIG. 6, it shares the disadvantage that implementation may become difficult at very high data rates, as encountered in e.g. digital storage of video signals. One cause of this difficulty is that the formation of the signals $G(e_k^{ij})$ in FIG. 7 requires a table look-up operation, a subtraction and application of the function G, which together may require more time than is permissible. A technique to overcome this problem will now be described.

To explain the technique, it is noted from FIG. 7 that the signals $G(e_k^{ij})$ depend only on $r_k$ and the digits $\hat{a}_{k-M}^i, \ldots \hat{a}_{k-2}^i$ of survivors $s_{k-1}^i$. Since $r_k$ is known, this leaves a total of $2^{M+1-2}=2^{M-1}$ possible values for $G(e_k^{ij})$. By precomputing all these values it becomes possible to make a direct selection of $G(e_k^{ij})$ on the basis of the actual digits $\hat{a}_{k-M}^i, \ldots, \hat{a}_{k-2}^i$, which requires substantially less time than the sequence of operations just mentioned. For the simplest possible case, viz. $M=2$ and $2^{M-1}=2$, an adaptive precomputation unit $APU^{ij}$ that makes use of this possibility is depicted in FIG. 8.

Figure 8:
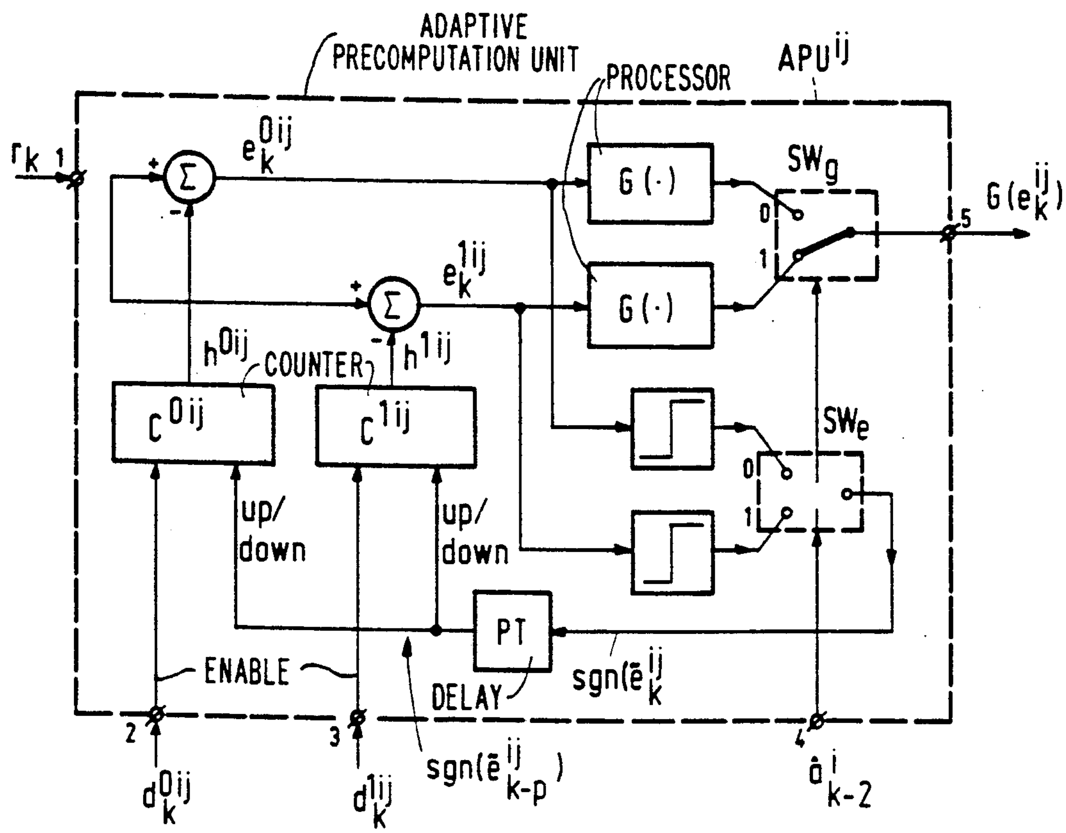
FIG. 8 shows a conceptual model of an adaptive precomputation unit for a receiver according to the invention.

In the system of FIG. 8, two digital up/down counters $C^{0ij}$ and $C^{1ij}$ replace the $w^{M-1}=2$ table entries of table $LUT^{ij}$ in FIG. 7. More specifically, these counters account for extended survivors with data vectors $\hat{a}_k^{ij}=[-1,I(i),I(j)]^T$ and $[+1,I(i),I(j)]^T$ by storing nonlinear function values $h^{0ij}=h([-1,I(i),I(j)]^T)$ and $h^{1ij}=h(]-1,I(i),I(j)]^T)$, respectively. Details about the use of digital circuits to represent and process discrete-time signals are not discussed here as they are well described in the literature, see e.g. the book "Theory and Application of Digital Signal Processing" by L. R. Rabiner and B. Gold, Prentice-hall, N.J., 1975.

Two adders serve to form error signals $e_k^{0ij}$ and $e_k^{1ij}$ by subtracting $h^{0ij}$ and $h^{1ij}$ from $r_k$. Subsequent application of the function G(.) yields signals $G(e_k^{0ij})$ and $G(e_k^{0ij})$, one of which corresponds with the signal $G(e_k^{ij})$ that is to be formed. To effectuate the proper selection, the digit $\hat{a}_{k-2}^i$ of survivor $s_k^i$ controls s switch $SW_g$ according to $$\text{If } \hat{a}_{k-2}^i=1 \text{ Then } G(e_k^{ij}):=G(e_k^{1ij}) \text{ Else } G(e_k^{ij}):=G(e_k^{0ij}). \quad (23)$$

Since $G(e_k^{0ij})$ and $G(e_k^{1ij})$ are both precomputed, the only delay incurred in generating $G(e_k^{ij})$ arises from the selection (23) and can be made very small.

In the circuit of FIG. 8, the digit $\hat{a}_{k-2}^i$ is used to deselect one of the two possible data vectors $\hat{a}_k^i=[--1,I(i),I(j)]^T$ and $\hat{a}_k^i=[+1,I(i),I(j)]^T$. This feedback operation is the counterpart of the linear feedback operation that takes place in a more implicit manner in the conventional receiver of FIG. 7, as explained, for example, in the aforementioned article by Bergmans et al. As a consequence of this feedback operation, only 4 out of the 8 possible vectors $\hat{a}_k^i$ remain to be considered in the total of 4 adaptive precomputation units $APU^{00}, \ldots, APU^{11}$, as opposed to the 8 vectors that would have to be considered in a Viterbi detector without feedback. Conceptually, this simplification may be justified by noting that the digit $\hat{a}_{k-2}^i$ that is fed back is the oldest and thus most reliable digit of the data vector $\hat{a}_k^i$ under consideration. Thus the probability that an erroneous selection takes place in the circuit of FIG. 8 is relatively small. Properties and conceptual backgrounds of Viterbi detectors with and without feedback are not elaborated here in further detail as they are well described in the literature, see e.g. the aforementioned article by Bergmans et al.

The configuration of FIG. 8 includes a simplified version of the mechanism of FIG. 5 for adaptation of the counters $C^{0ij}$ and $C^{1ij}$ on the basis of delayed digits $\hat{a}_{k-M-P}^i, \ldots, \hat{a}_{k-P}^i$. As explained earlier, the mechanism of FIG. 5 is preferable over the one of FIG. 4 and FIG. 7 in that it lowers convergence problems for functions $f(a_k)$ with a weak dependence on the most recent digits of $a_k$, such as $a_k$ and $a_{k-1}$. Said simplification stems from a sign operation that is performed on the error signals $e_k^{0ij}$ and $e_k^{1ij}$ to obtain one-bit error signals that are conveniently handled with digital circuitry. A switch $SW_e$ with a feedback function similar to that of $SW_g$ is controlled by $\hat{a}_{k-2}^i$ to obtain the one-bit and undelayed counterpart $sgn(e_k^{ij})$ of the error signal $e_{k'p}^{ij}$ of eq. (13). This signal $sgn(e_k^{ij})$ is applied to a binary shift register that introduces a delay of P symbol intervals T. The delayed error signal $sgn(e_{k-P}^{ij})$ serves to update the contents of the counters according to the sign algorithm $$h^{1ij}:=h^{1ij}+q.d_k^{1ij}.sgn(\hat{e}_{k-P}^{1ij}) \text{ for all } I,i,j \in\{0,1\}. \quad (24)$$

Details about this simplified version of the LMS algorithm can be found, for example, in an article by N. Holte and S. Stueflotten entitled "A New Digital Echo Canceller for Two-Wire Subscriber Lines", IEEE Trans. Commun., Vol. COM-29, pp. 1573-1581, Nov. 1981. This article discusses the application of the Sign-algorithm to adaptive table look-up filters, and is as such closely related to the application presently being discussed. In (24), $d_k^{1ij}$ is a binary selector signal to be described, not to be confused with the signal $d_k^{ij}$ of FIG. 7. Furthermore, q is the quantization step size that corresponds to an increment or decrement of counter $C^{1ij}$ by one unit. By an appropriate finite word-length represnetation of the quantities in FIG. 8, it is possible to select a suitably small value for q. Details of this finite word-length representation are not elaborated here as they are well described in the literature, see e.g. the aforementioned book by Rabiner and Gold.

Because of the delay over P symbol intervals T, the delayed error signal $sgn(e_{k-P}^{ij})$ is by (1) a function of the delayed data vector $a_{k-P}$. As explained in the aforementioned article by Holte and Stueflotten, for a proper operation of the sign algorithm of (24), only that counter $C^{1ij}$ should be updated for which $[I(1),I(i),I(j)]^T=a_{k-P}$. When P is taken sufficiently large, the vectors $b_k^0$ and $b_k^1$ of (11) are both comparatively reliable estimates of $a_{k-P}$, and either of them can thus be used for the formation of the selector signal $d_k^{1ij}$ according to the rule $$\text{IF } \hat{a}^n_{k-P-2} = I(1) \text{ AND } \hat{a}^n_{k-P-1} = I(i) \text{ AND } \hat{a}^n_{k-P} = I(j) \text{ THEN } d_k^{1ij} = 1 \text{ ELSE } d_k^{1ij} = 0 \quad (25)$$

which is applied for either $n=0$ or $n=1$ and for all 8 possible combinations (1,i,j). Alternative rules in which both vectors $a_k^0$ and $a_k^1$ are used for the formation of essentially equivalent selector signal signals are, of course, equally suitable but are not described here for the sake of brevity.

In the configuration of FIG. 8, the signals $d_k^{1ij}$ and $sgn(e_{k-P}^{1ij})$ are connected to the COUNT ENABLE and UP/DOWN inputs of counters $C^{1ij}$ in order to realize the iteration of (24). Depending on such implementation details as the type of counters used, slight modifications of the configuration of FIG. 8 may be needed to realize the iteration of eq. (24) in a convenient manner. In this respect FIG. 8 is merely illustrative, and is not meant to restrict in any sense the use of the signalgorithm as described above.

For the sake of completeness it is necessary to mention that the configuration of FIG. 8 can be easily modified for use of the LMS rather than signalgorithm by omitting the Sign-operations in FIG. 1. The counters of FIG. 8 should then be replaced by digital accumulators that store $h_k^{1ij}$ and can be updated in steps $q.e_{k-P}^{ij}$ that may assume a multitude of sizes. Intermediate forms of the LMS and sign algorithms arise when such an accumulator is used in combination with a multi-bit quantizer instead of the sign operation in FIG. 8. Also, u or q can be variable rather than fixed. For example, for rapid convergence it is attractive to start adaptation with a relatively large value of u or q. Subsequently, u or q may be decreased gradually or step-wise to a value that is appropriate for small steady-state adaptation errors. Thus, with respect to the precise adaptation algorithm used, FIG. 8 is meant to be illustrative rather than restrictive.

It is straightforward to generalize the configuration of FIG. 8 to channel memory lengths M greater than 2. In this case, the M−1 digits $\hat{a}_{k-M}^{i}, \ldots, \hat{a}_{k-2}^{i}$ give a total of $2^{M-1}$ possible values of $G(e_k^{ij})$. To pre-compute these values, $2^{M-1}$ adaptive counters with accompanying circuitry are needed, and the switches $SW_g$ and $SW_e$ are then used to select the signals $G(e_k^{ij})$ and $Sgn(e_k^{ij})$ under control of the M−1 digits $\hat{a}_{k-M}^{i}, \ldots, \hat{a}_{k-2}^{i}$. Further details of this generalization are not discussed here as they should be sufficiently self-evident after the foregoing explanations.

Figure 9:
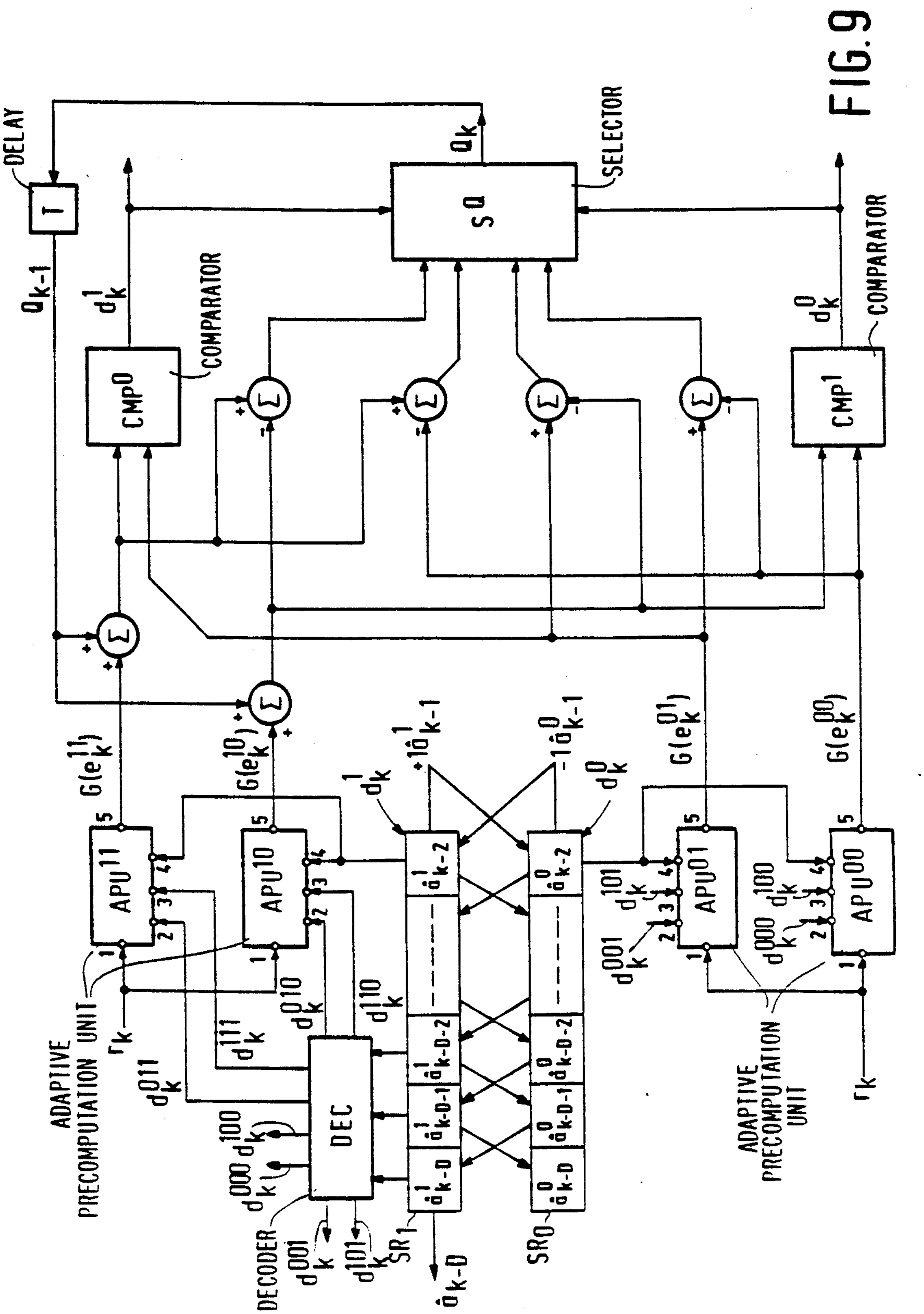
FIG. 9 shows a conceptual model of an adaptive 2-state Viterbi detector with nonlinear feedback according to the invention that uses adaptive precomputation units according to FIG. 8.

Application of adaptive precomputation units like the one of FIG. 8 facilitates the attainment of high data rates. FIG. 9 depicts a model of a two-state Viterbi detector according to the invention in which the precomputation units of FIG. 8 are applied. The detector of FIG. 9 rather distinguishes itself from the one of FIG. 7 in that it employs a faster method of calculating $Q_k$. In FIG. 7, calculation of $Q_k$ can not start before the selection process in compare/select units $CS^0$ and $CS^1$ is completed. In FIG. 9, on the other hand, these actions occur largely in parallel. To explain this parallelism, it is noted from expression (18) that $$Q_k^j = Min(G[e_k^{0j}], Q_{k-1}+G[e_k^{1j}]) \qquad (26)$$

for both j=0 and j=1. With (19) this means that $$Q_k = Min(G[e_k^{01}], Q_{k-1}+G[e_k^{11}]) - Min(G[e_k^{00}], Q_{k-1}+G[e_k^{10}]). \qquad (27)$$

Hence $Q_k$ assumes one out of four possible values $$G[e_k^{01}]-G[e_k^{00}],\ G[e_k^{01}]-(Q_{k-1}+G[e_k^{10}]),\ Q_{k-1}+G[e_k^{11}]-G[e_k^{00}], \text{ and } Q_{k-1}+G[e_k^{11}]-(Q_{k-1}+G[e_k^{10}])) = G[e_k^{11}]-G[e_k^{10}]).$$

In FIG. 9, these 4 possible values are calculated with the help of 4 summators, and concurrently the comparators $S^0$ and $S^1$ produce the logical signals $d_k^0$ and $d_k^1$ of eq. (21). Upon completion, the actual value of $Q_k$ is merely selected from the 4 possible values in a selection circuit $S^q$ under control of $d_k^0$ and $d_k^1$. From eqs. (18), (20) and (22) it may be seen that these two bits provide exactly enough information for this selection. As selection is usually a faster process than addition, the configuration for calculating $Q_k$ in FIG. 9 may be applicable at higher data rates than the one of FIG. 7, though at the cost of additional hardware, notably 3 additional adders.

The selector signals $d_k^{1ij}$ for the adaptive precomputation units $APU^{ij}$ in FIG. 9 are generated by a decoder DEC that operates on the digits $\hat{a}_{k-D}^1$, $\hat{a}_{k-D+1}^1$ and $\hat{a}_{k-D+2}^1$ according to the decoding rule of eq. (25) for n=1 and the largest possible delay P=D−2. Further details of the receiver of FIG. 9 are not discussed here as they are entirely similar to those of the receiver of FIG. 7.

For illustrative purposes it is mentioned here that the complete receiver according to FIGS. 8 and 9 may be implemented with approximately 80 digital integrated circuits from the standard ECL 100K series as described, for example, in the "F100K ECL data book", Fairchild Camera and Instrument Corporation, Mountain View, Calif. 1982. In this implementation, internal signals of the receiver are represented with a word-length of at most 6 bits. The attainable data rate amounts to approximately 50 Mbit/s. Even for digital video storage applications this may be an appropriate value.

Figure 11:
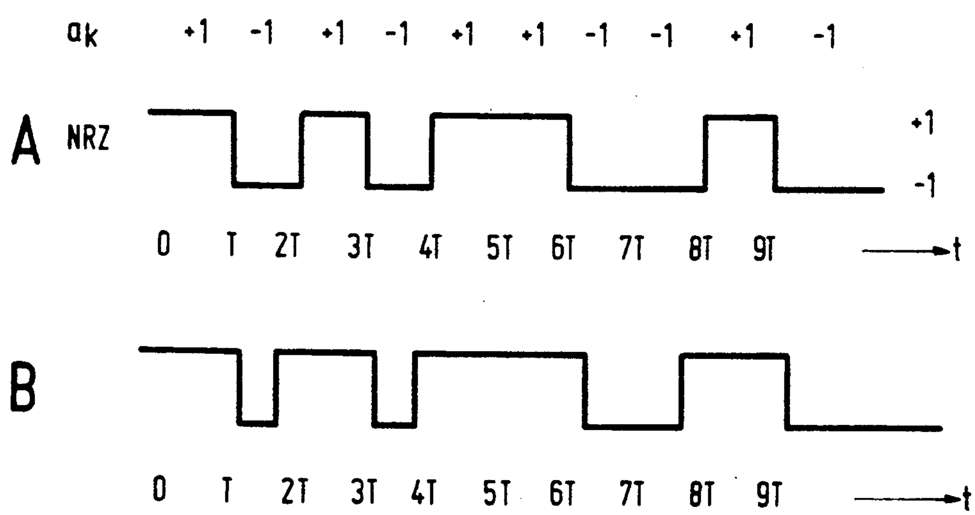

To illustrate the merits of receivers according to the invention, FIG. 10 depicts bit error characteristics that were obtained by simulation for a receiver of prior art conforming to FIG. 7 (curve a.) and one according to the invention that conforms to FIGS. 8 and 9 (curve b.). Both receivers operate on the output of an equalized optical recording channel with nonlinear ISI and a memory length M=2, to which random (NRZ) data is applied. The nonlinearities arise from a systematic difference in the length of the pits and lands that represent runs of zeros and ones. The curves of FIG. 10 pertain to a situation with severe nonlinear ISI, in which systematic errors in the writing process cause runs of zeros and ones to be T/2 seconds shorter and longer than their nominal value, respectively. This situation is illustrated in FIG. 11. In this Figure, the upper trace A depicts the NRZ waveform that is applied to the channel, while the lower trace B depicts the corresponding pattern of pits and lands that is assumed to be recorded on the optical medium. The systematic difference in the lengths of pits and lands manifests itself in the replayed signal as severe nonlinear ISI. In addition to this nonlinear ISI, the replayed signal is taken to contain linear ISI as a result of the channel bandwidth limitations that are reflected in FIG. 12. The curve that is labeled C in FIG. 12 depicts the transfer characteristic of the linear part of the channel. The loss of around 20 dB at the Nyquist frequency 1/(2T) is characteristic for recording at high information densities, and results in severe linear ISI in the replay signal. As both simulated receivers are only able to handle the comparatively small memory length M=2, an equalizer operating on the replayed signal is used to shorten the memory length of the channel into a memory length M of approximately 2 symbol intervals. Techniques for designing this equalizer are not discussed here as they are well described in the literature, see e.g. an article by D. D. Falconer and F. R. Magee, Jr Entitled "Adaptive Channel Memory Truncation for Maximum Likelihood Sequence Estimation", Bell Syst. Tech. J., Vol. 52, pp. 1541-1562, Nov. 1973. The amplitude-frequency characteristics of the equalizer are depicted in the curve that is labeled D in FIG. 12. Both the equalizer and the linear part of the channel have linear phase characteristics. A third disturbance, white Gaussian noise that models possible noise sources in the system, is added to the output signal of the channel, i.e. just before the input of the equalizer.

FIG. 10 confirms the superiority of the receiver according to the invention (curve b.) over its conventional counterpart (curve a.) in dealing with nonlinear ISI. While the former receiver is unable to achieve useful performance levels even at very high signal-to-noise ratio's, the latter one already achieves bit error rates of around $10^{-4}$ for signal-to-noise ratio's of about 16 dB. Additional simulations reveal that this represents a loss of only 3 to 4 dB with respect to a corresponding situation without nonlinearities. Thus a receiver according to the invention may provide an attractive degree of insensitivity to nonlinear ISI, unlike its predecessors of prior art.

For the sake of completeness, it is mentioned that the performance of the conventional receiver can be improved with respect to curve a. in FIG. 10 by preceding it by a DC-blocking circuit. This possibility stems from the fact that a major effect of the nonlinearity mechanism of FIG. 11 is a shift of DC-level. This effect is easily dealt with by conventional means, such as a DC-blocking circuit. For nonlinearity mechanisms with a more complicated nature than the one of FIG. 11, however, such a circuit may prove to be largely ineffective, whereas the receiver according to the invention is effective irrespective of the precise nonlinearity mechanism.

We claim:

1. A system for transmitting a data signal at a symbol rate 1/T through a noisy dispersive channel to a data receiver, where the channel introduces intersymbol interference and noise into the transmitted data signal; and the receiver estimates the most likely sequence of transmitted data symbols by keeping track of candidate data sequences that are recursively updated on the basis of likelihood measures which are determined by signal processing means including means for estimating hypothesized channel outputs in the absence of noise, and detector means comprising means for comparing the hypothesized channel output with an actual channel output signal to form an error signal, and means for processing the error signal to provide a measure of accumulated likelihood of each candidate data sequence, characterized in that said means for estimating hypothesized channel output signals in the absence of noise comprises one or more look-up tables.

2. A system as claimed in claim 1, wherein said signal processing means keeps track of two candidate data sequences, and the likelihood measure is representative of the difference of a function of the likelihood of both candidate data sequences.

3. A system according to claim 2, further characterized in that said likelihood measure is determined by selection among precomputed candidate values of said likelihood measure.

4. A system according to claim 1, 2 or 3, further characterized in that said look-up tables take the form of registers that store hypothesized channel output symbols in the absence of noise.

5. A system for transmitting a data signal at a symbol rate 1/T through a noisy dispersive channel to a data receiver, where the channel introduces intersymbol interference and noise into the transmitted data signal; and the receiver estimates the most likely sequence of transmitted data symbols by keeping track of candidate data sequences that are recursively updated on the basis of likelihood measures which are determined by signal processing means including means for estimating hypothesized channel outputs in the absence of noise, and detector means comprising means for comparing the hypothesized channel output with an actual channel output signal to form an error signal, characterized in that said means for estimating hypothesized channel output signals in the absence of noise comprises one or more look-up tables which are adapted under the control of digits of said candidate data sequences, in response to said error signal.

6. A system according to claim 5, further characterized in that each look-up table takes the form of a digital counter that is adapted under the control of one or more delayed digits of said candidate data sequences, in response to an error signal that is representative of the difference of a delayed version of the channel output signal and the contents of said counter.

7. A system according to claim 5, further characterized in that each likelihood measure is representative for an accumulated version of a function that essentially equals the modulus of the difference of the actual channel output signal and a hypothesized channel output signal in the absence of noise.

8. System according to claim 7, further characterized in that said function is determined by selection among precomputed candidate values of said function.

9. A system for transmitting a data signal at a symbol rate 1/T through a noisy dispersive channel to a data receiver, where the channel introduces intersymbol interference and noise into the transmitted data signal; and the receiver estimates the most likely sequence of transmitted data symbols by keeping track of candidate data sequences that are recursively updated on the basis of likelihood measures which are determined by signal processing means including means for estimating hypothesized channel outputs in the absence of noise, and detector means comprising means for comparing the hypothesized channel output with an actual channel output signal to form a first error signal, characterized in that said means for estimating hypothesized channel output signals in the absence of noise comprises one or more look-up tables which are adapted in response to a second error signal that is representative of the difference of a delayed version of the channel output signal and the output signal of said look-up table when addressed by one or more delayed digits of said candidate data sequences.

* * * * *